Figure 4:
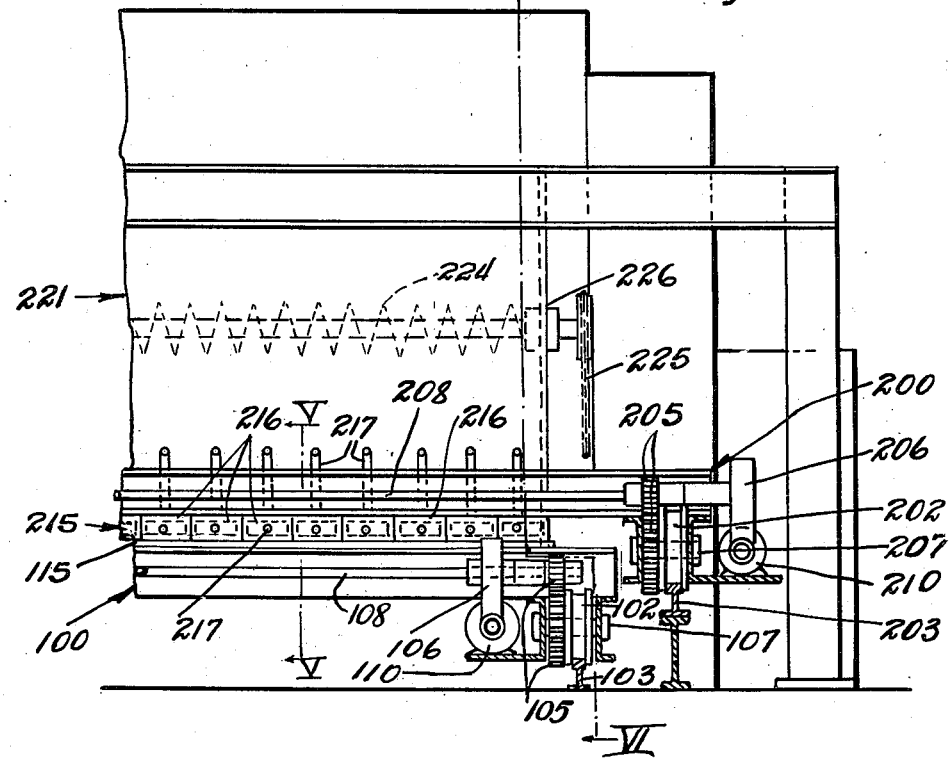

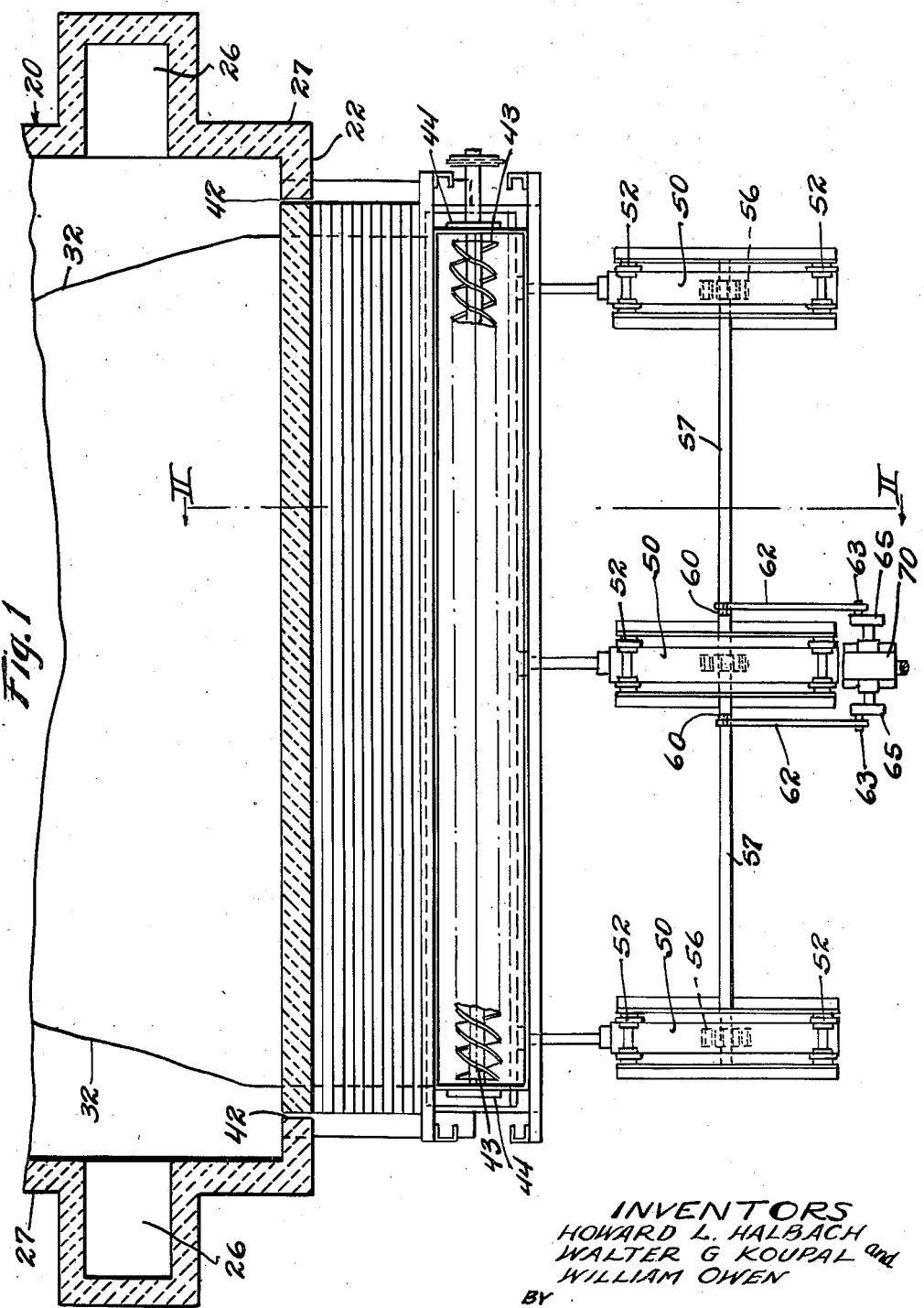

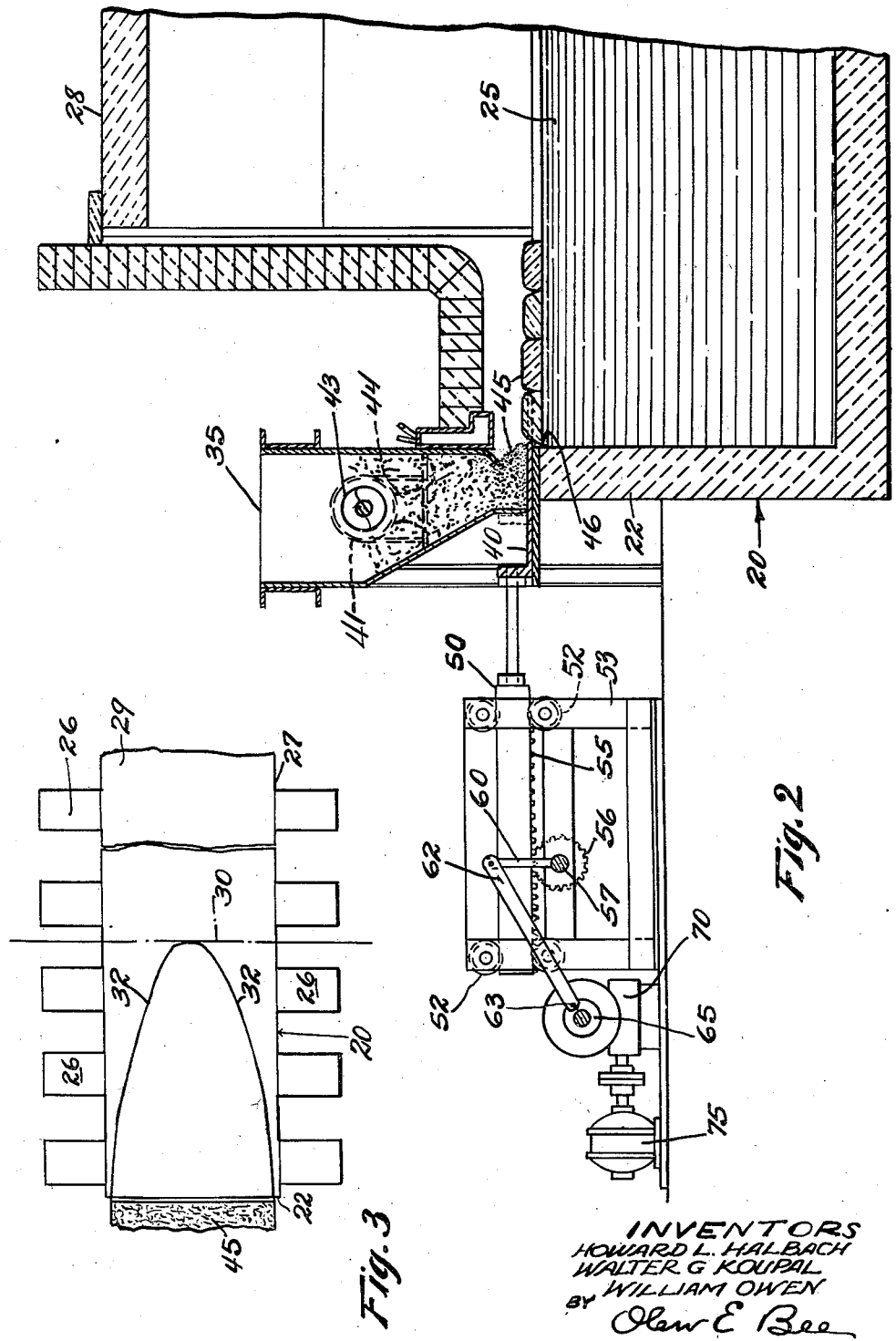

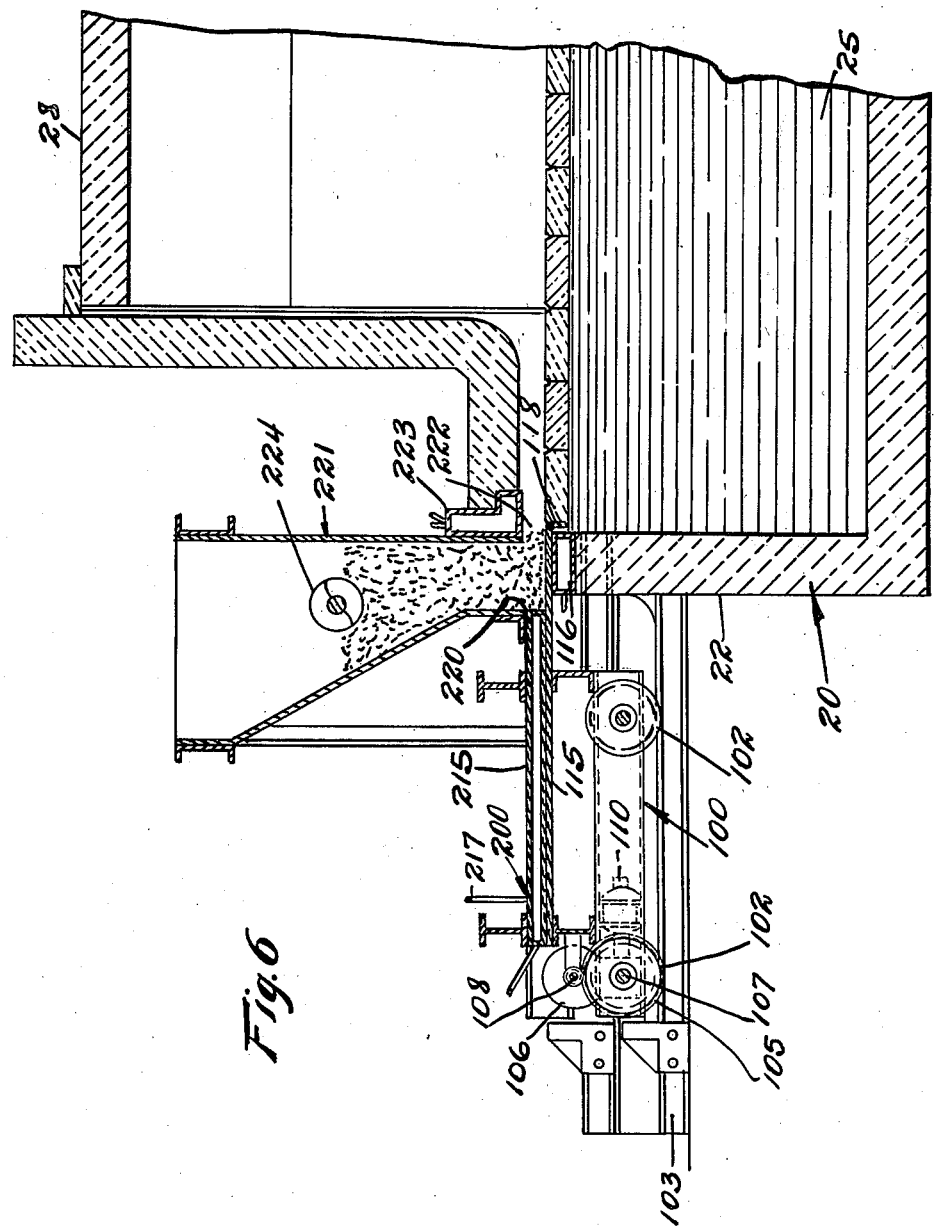

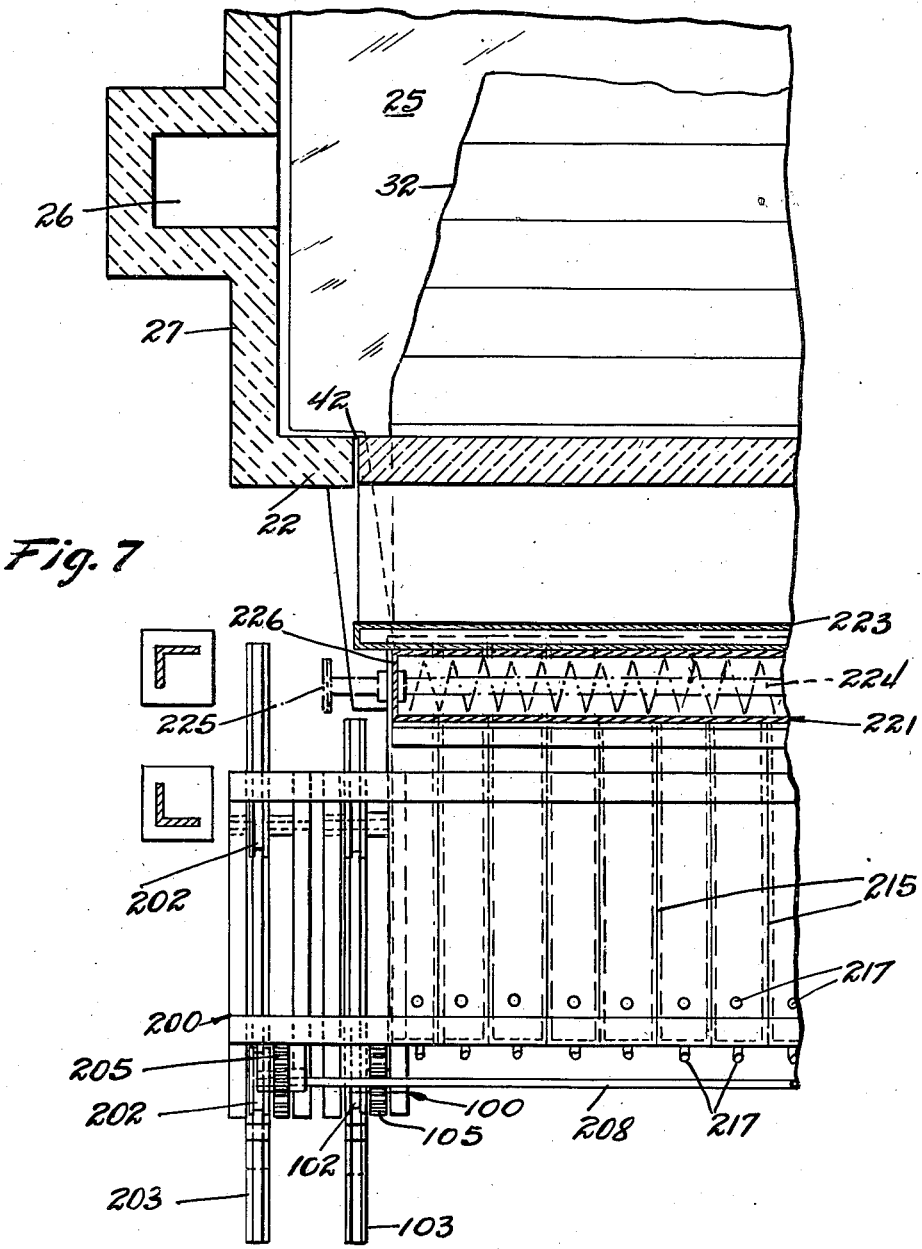

Patented Aug. 24, 1943

2,327,887

UNITED STATES PATENT OFFICE 2,327,887

BLANKET FEEDER FOR GLASS DRAWING TANKS

Howard L. Halbach and Walter G. Koupal, Clarksburg, W. Va., and William Owen, Pittsburgh, Pa., assignors to Pittsburgh Plate Glass Company, a corporation of Pennsylvania Application February 14, 1940, Serial No. 318,878

10 Claims. (Cl. 49—54)

This invention relates to a method of and apparatus for feeding glass-making material into a melting tank and it has particular relation to the feeding of a uniform blanket of such material upon a molten glass bath.

One object of the invention is to provide an improved method of feeding a relatively uniform blanket of glass-making batch into a melting tank and controlling the action of the blanket in such manner as to insure uniform melting thereof in the tank.

Another object of the invention is to provide an improved method of feeding the glass-making material into a melting tank in such manner as to provide for exposing substantially maximum area of the material to a melting heat in the tank.

Another object of the invention is to provide a method of uniformly and progressively feeding a glass batch material into a melting tank in such manner as to insure melting of the material at lower temperatures than those required for melting like material fed by conventional methods.

Another object of the invention is to provide an improved method of successively feeding layers of glass batch material into a melting tank to form a blanket of substantially uniform thickness and progressively moving the material into tank until it is melted.

Another object of the invention is to provide an improved apparatus for feeding the glass batch material uniformly into a tank of molten glass.

Another object of the invention is to provide an improved apparatus for progressively feeding layers of glass batch material into a melting tank to form a substantially uniform blanket of the material as it proceeds into the tank.

In the conventional and customary practice of feeding batch material into a glass melting tank or furnace, certain disadvantages are present by virtue of the difficulty experienced in securing uniform melting of the material and also in securing maximum efficiency of the heating mediums employed to reduce the material to molten state. It is customary to employ flames from fuel, such as gas, projected laterally from opposite sides of the furnace through ports formed therein. Various types of feeding devices for granular material have been employed, such as those which deposit the material in localized heaps at various locations adjacent the entrance end of the tank. Other types dump quantities of batch material adjacent the entrance end of the tank and the material, as it is melted, flows toward the exit, or glass drawing end of the tank.

Although the gas flames for melting the material appear to envelope practically all of the exposed area of this heaped and unevenly distributed material, it has been observed that considerable amount of the heat required to melt the batch was applied by conduction through the molten bath itself to the portion of the material below its surface. This condition is caused in view of the fact that in the previously-known methods, a considerable amount of the localized piles of the batch sank below the surface of the molten bath.

According to this invention, the glass-making material is fed uniformly to provide a relatively thin layer or blanket of material beginning at the entrance end of the furnace while maintaining such blanket progressively in substantially the thin blanket form as it is moved farther into the tank and progressively melted. Cullet can be added to the batch in desired proportions. This kind of uniform blanket is susceptible to melting much more uniformly and efficiently than the batch fed by known methods because the gas flames can then be directed into contact with a greater portion of the thin blanket on the exposed surface thereof. Ordinarily in conventional practice, the temperature required for proper melting of the batch is of such intensity than the refractories of which the tank walls are constructed are taxed almost to their limit. However, by employing the improved method of providing a thin blanket of material over the surface of the bath, the melting can be accomplished at materially reduced temperatures. That is, instead of employing temperatures almost equal to the critical resistance of the refractories, more favorable tolerances in safety factors of the refractories are available. Hence, the life of the the refractories is greatly prolonged without adversely affecting the molten condition of the glass bath. Material saving in both the refractory walls of the tank and the gas fuel can thus be effected. Reduction of temperatures in the values of 75 degree to 100 degrees F., as compared with conventional operation of glass melting tanks, result from the practice of the improved method.

Figure 5:
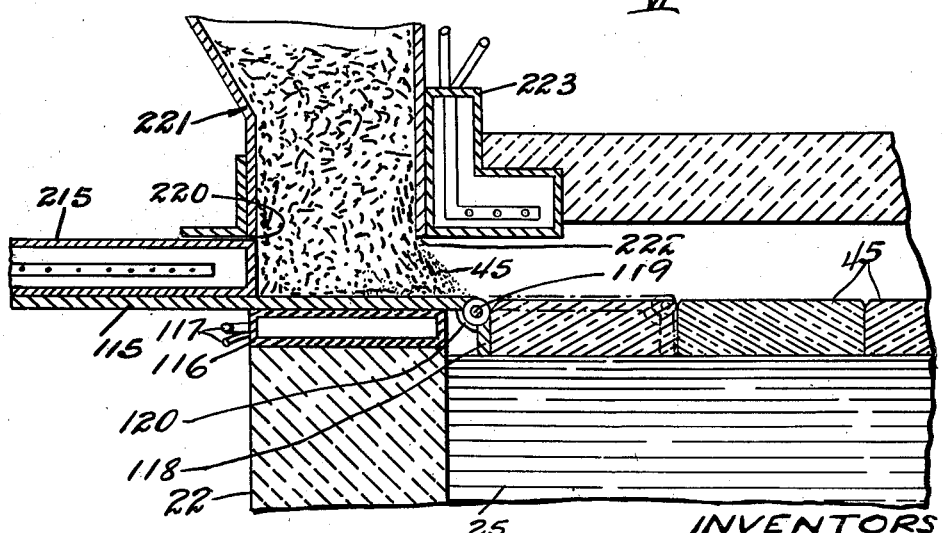

In the drawings:

Fig. 1 is a fragmentary plan of feeding mechanism applied to a glass melting tank, parts of which are shown in horizontal section; Fig. 2 is a vertical section taken substantially along the line II—II of Fig. 1; Fig. 3 is a diagrammatic fragmentary plan of a glass melting tank; Fig. 4 is a fragmentary front end elevation of a tank and another form of feeding mechanism; Fig. 5 is a fragmentary vertical section, on a larger scale, taken substantially along the line V—V of Fig. 4, and showing in detail a portion of the feeding mechanism; Fig. 6 is a fragmentary vertical section taken substantially along the line VI—VI of Fig. 4; and Fig. 7 is a fragmentary plan of a feeding mechanism as applied to a tank which is shown in horizontal section.

In practicing the invention, a glass melting tank or furnace 20 is provided with an entrance extremity 22 and during its operation contains a bath of molten glass 25 which is maintained in molten state by means of flames from suitable fuel fed through ports 26 in the tank walls 27. The tank includes a roof 28, supported upon the tank walls, according to well-known methods of construction. The flames are played over the surface of the bath alternately at proper intervals from opposite sides of the tank. Ordinarily tanks of this general type are operated continuously and the molten bath moves toward the exit extremity 29 from which glass can be drawn in sheet form.

According to this invention, the batch of ingredients for making glass are mixed and fed uniformly upon the surface of the molten bath. Flames playing over the upper surface of the uniformly spread material causes it to melt gradually as the glass bath moves away from the entrance extremity and the replenishing or incoming material is entirely melted approximately by the time it reaches the location indicated in Fig. 3 by the transverse broken line 30. The unmolten blanket of material assumes the shape indicated at 32 of this figure. That is, the width and thickness of the blanket of material diminishes gradually as it passes farther into the tank until the bath, toward the exit end of the tank is in uniformly melted state.

A hopper 35, filled to predetermined depth with granular glass-making material which contains proper ingredients and admixed to such consistency as to produce the type of sheet glass desired, extends substantially the entire distance across the entrance portion of the tank and the granular material or batch rests under gravity upon a horizontal reciprocable carrier or plate 40 that extends transversely across the entrance extremity of the tank adjacent its entrance opening 42 which corresponds substantially to the discharge opening of the hopper. This plate is reciprocable from the full line to the broken line position indicated in Fig. 2. If desirable, a reversible screw type of leveler 43 can be mounted in the hopper upon suitable supports 44 and rotated in either direction by means of a sprocket and chain gear 41 to maintain a substantially constant head or depth of the material in the hopper.

When the plate 40 is disposed in its full line position with the material from the hopper resting thereon; then the forward horizontal movement of the plate to the broken line position carries with it a predetermined layer 45 of the batch material. The latter material is then positioned immediately overhanging the surface of the molten bath and the material in the hopper drops down upon the extended plate behind the portion which has been moved forwardly. By moving the plate 40 rearwardly, that is, by withdrawing it, from its position above the bath, the layer 45 can not also be carried backwardly because the space previously occupied by this layer will have been filled by the material dropping behind it from the hopper. Hence, by withdrawing the plate 40, the batch layer 45 begins to drop upon the bath from the forward plate edge and continues to drop therefrom as the latter moves rearwardly and until the material is spread or distributed substantially uniformly along an area corresponding in width to the distance from the forward limit of reciprocation of the plate 40 to the adjacent edge 46 of the tank. The rear wall of the hopper has its lower edge almost in frictional contact with the upper surface of the plate 40 (Fig. 2), to prevent rearward displacement of the batch from the hopper. In the succeeding forward movement of the plate in its reciprocation, the next layer 45 of material, as previously described, will be moved forwardly and against the first layer 45 in such manner as to push the first layer farther into the tank. This action is repeated intermittently at desired intervals, or constant reciprocation of the plate is timed in such manner as to provide for uniformly feeding the batch material at whatever rate that is desired.

In one form of reciprocating mechanism, the rearward portion of the plate 40 is connected rigidly to a plurality of parallel horizontal rails 50 which are carried between upper and lower flanged wheels 52. Suitable supports 53 rotatably carry the wheels. The lower side of each rail 50 is provided with a rack 55 that engages a pinion 56, the latter of which is rigidly mounted upon a shaft 57 for equalizing the reciprocating motion of the plate at each side of the central rail 50. Oscillatory arms 60 extend rigidly and in upward parallel relation from the shaft 57. The outer end of each arm 60 is pivoted to one end of a pitman 62 which has its other end pivoted upon a crank pin 63 of a rotatable element 65 of a conventional gear reduction unit 70. Since this type of unit is well known, detailed description thereof is not essential for proper understanding of the invention. A suitable motor 75 is connected to the unit to drive the rotatable element.

In the form of feeding mechanism shown in Figs. 4 to 7, a carriage 100 extending substantially the width of the tank 20 adjacent its entrance extremity 22 is provided with flanged wheels 102 supporting the carriage upon tracks 103. Suitable gearing 105 and a gear reduction unit 106 are connected in driving relation by means of transverse shafts 107 and 108 to the wheels and to a conventional reversible motor 110. The transverse shaft 107 which is rotatable in the carriage connects the gearing and motor to the wheels 102 on opposite sides of the carriage adjacent the tracks 103.

The front portion of the carriage rigidly supports a batch carrier in the form of a plate 115 which extends in a horizontal plane across the entrance extremity of the tank and its front marginal portion rests upon a hollow water cooled sill 116, in which water is circulated by means of conduits 117 communicating therewith. By operation of the motor 110, the plate 115 is reciprocable from the full line position to the broken line position shown in Fig. 5. The forward edge of the plate is provided with a downwardly projecting lip 118, which can be pivoted thereto, as indicated at 119, and provided with a stop 120 engageable with the lower side of the plate to prevent rearward pivotal motion. This lip serves as a pusher and its lower edge is disposed immediately adjacent the upper surface of the molten glass bath in the tank 20. When the plate is withdrawn, the lip can be pivoted to the right in the event it strikes any portion of material which might be left upon the surface of the bath or on the lip.

A second carriage 200 is provided with flanged wheels 202 mounted upon tracks 203 which are disposed in parallel relation to the tracks 103. Transmission gearing 205 and a gear reduction unit 206 are mounted upon the shafts 207 and 208 that are rotatably supported transversely in the carriage 200 and are connected in driving relation to a suitable reversible motor 210. The forward portion of this carriage 200 is provided with a batch discharger in the form of a substantially horizontal slide 215, which is composed of a plurality of hollow sections 216 arranged rigidly in side by side relation upon the carriage 200 and move as a unit therewith. Suitable water supplying conduits 217 communicate with the interior of each hollow section 216 to maintain the latter at proper temperature. The slide 215 is disposed in face to face relation upon the upper side of the plate 115 and is slidable relative thereto.

An opening 220 in the rear side of a hopper 221 corresponding to the hopper 35 receives the plate 115 and the slide 215 as a unit in slidable relation therethrough and these elements are also movable as a unit through an opening 222 in the forward side of the hopper leading into the tank 20. If desirable, an additional hollow cooler 223 can be mounted upon the tank 20 along the lower forward side of the hopper 221 and a suitable screw or other type of leveler 224 is disposed horizontally in the hopper and can be rotated by means of a manually operable sprocket wheel and chain gearing 225 secured upon each end of the screw leveler 224. Bearings 226 in the ends of the hopper rotatably support the leveler 224.

From this description, it will be apparent that the slide 215 and plate 115 are independently movable, or movable concurrently as a unit, in substantial horizontal planes. In operating this type of structure, the batch material fed from the hopper, and maintained at proper level therein, rests upon the slidable plate 115 in the manner shown in Figs. 5 and 6. The slidable plate 115 and slide 215 are then moved as a unit forwardly into the tank to a position immediately above the molten bath. Then, while the slide 215 remains stationary for a predetermined period, the plate 115 is retracted. As the latter moves rearwardly, the material supported thereon is forced progressively off the front edge thereof and is evenly distributed in a layer extending from the location of the forward limit of movement of the plate edge back toward the plate supporting wall of the tank. That is, the plate 115 is drawn out from under the batch layer 45. As soon as the plate has been moved rearwardly in this manner to its rearward position, the upper slide 215 is then withdrawn to its full line position to permit another layer 45 of the material to be deposited from the hopper upon the plate 115. Then the cycle of operation is repeated and the pusher 118 aids in moving the previously deposited layer in the tank in a forward direction to provide an unobstructed space for depositing the succeeding layer.

The motors 110 and 210 are controlled in conventional manner to operate concurrently or independently and intermittently in the execution of the movements of the plate 115 and slide 215 as described.

Although practical construction in which the invention has been incorporated has been shown and described in detail, it will be apparent to those skilled in the art that the invention is not so limited, but that various changes can be made therein without departing from the spirit of the invention or from the scope of the appended claims.

We claim:

1. In a method of treating granular glass making material upon a molten glass bath in a melting tank having entrance and exit extremities which comprises distributing a relatively thin series of successive layers of the material in side by side relation substantially across the width of the tank adjacent the entrance extremity thereof for forming a bath-covering blanket, moving said layers successively in side by side relation toward the exit end of the tank to provide space on the bath for succeeding layers in the successive application thereof, and melting said layers of material progressively into the molten bath as they move toward the exit extremity of the tank.

2. A method of feeding granular glass making material upon a molten glass bath in a melting tank having entrance and exit extremities which comprises successively supporting and moving layers of granular material to a position immediately above the molten bath adjacent the entrance extremity and progressively relieving support of each layer from its forward extremity rearwardly to deposit said layer evenly upon the molten bath.

3. In a method of treating granular glass-making material in a molten glass bath, the steps which comprise distributing on the bath a relatively thin layer of the material substantially across the width of the bath at one extremity thereof, moving said layer forwardly on the bath a distance substantially equal to the layer width, adding a layer of material similar to the first layer in the place from which said first layer is moved, continuing the forward movement of the applied layers and adding layers of material in the manner defined with reference to the first two layers to provide a blanket layer of material over a substantial portion of the bath, and progressively melting the material as it moves across the surface of the bath.

4. In a method of feeding granular glass-making batch upon a molten glass bath in a melting tank, the steps which comprise reciprocating a batch support laterally to and from a position over the body of the molten bath, feeding the batch upon the support and reciprocating the latter in such manner that the batch is dropped in layer form upon the surface of the bath during the rearward stroke of the reciprocating action, and pushing the dropped batch in its layer form forwardly along the surface of the bath during the forward stroke of the reciprocating action to provide space for the next succeeding layer of batch deposited by the rearward stroke.

5. In a method of feeding glass-making material upon a molten glass bath in a melting tank having entrance and exit extremities, the steps which comprise supporting a supply of material and moving it forwardly to a position immediately above the molten bath, maintaining sufficient head of the material to cause automatic refilling of the space left by the carrying forward of said supply, relieving support of the supply of material from its forward extremity rearwardly and thereby causing the depositing on the bath of the material in a layer from its forward portion rearwardly, and pushing forward the deposited layer as the incoming supply is moved forwardly to its position above the bath to make room for the succeeding layer of the material to be deposited in the manner specified.

6. In an apparatus including a glass melting tank having a molten glass bath therein, a batch laying device movable forwardly and rearwardly into and out of position above the molten bath to carry forwardly a layer of batch therewith, means for depositing the batch in layer form from the forward extremity of said device as the latter is moved rearwardly, and means associated with said device to push the layer of batch forwardly on the bath thereby making room for a succeeding layer of batch to be deposited as the device is moved rearwardly.

7. In an apparatus including a glass melting tank having a molten glass bath therein, a hopper opening into the tank and extending substantially across the tank width to supply granular batch, a reciprocable layer-depositing member constituting the bottom of the hopper and movable inwardly to a position directly overhanging the molten bath to carry layers of batch into the tank, said hopper having a member disposed immediately adjacent the upper surface of the reciprocable member preventing rearward movement of the batch whereby the reciprocable member in its rearward movement is retracted from beneath the batch, dropping the latter upon the bath, and means associated with said members to push the layer of batch forwardly on the bath thereby making room for a succeeding layer of batch to be deposited.

8. In an apparatus including a glass melting tank having a molten glass bath therein, a reciprocable member movable into the tank immediately above the bath to carry a layer of batch therewith, a second reciprocable member movable into the tank adjacent the first member, said reciprocable members including mechanism for relatively moving them thereby discharging the layer of batch on the glass bath, and means associated with one of the members to push the layer of batch forwardly on the bath and make room for a succeeding layer of batch.

9. In an apparatus including a tank having a molten glass bath therein, a batch supporting carrier movable to and from a position immediately above the bath to carry forwardly a layer of batch, a batch discharger having means for moving it with the carrier into and out of position immediately above the bath, said carrier and discharger including mechanism for relatively moving them thereby discharging the batch layer upon the bath, and means associated with said carrier to push the deposited layer of batch forwardly on the bath thereby making room for a succeeding layer of batch.

10. In an apparatus including a tank having a molten glass bath therein, a batch supporting carrier extending across an extremity of the tank and movable to and from a position immediately above the bath to carry forwardly a layer of batch, means for supplying granular batch to the carrier, a batch discharger having means for moving it with the carrier into and out of position immediately above the bath and including a forward edge spaced rearwardly from the forward edge of the carrier to form a barrier against rearward movement of batch, said carrier and discharger including mechanism for withdrawing the carrier from beneath the batch layer which was carried forward and maintaining the discharger in its forward position while the carrier is being withdrawn, and means associated with said carrier to push the deposited layer of batch forwardly on the bath thereby making room for a succeeding layer of batch.

HOWARD L. HALBACH.
WALTER G. KOUPAL.
WILLIAM OWEN.